United States Patent [19]

Czyzewski et al.

[11] 4,445,429
[45] May 1, 1984

[54] APPARATUS FOR CHILLING AND PLASTICIZING FATTY MATERIALS

[75] Inventors: Ted S. Czyzewski, Bloomingdale; Bartley A. Greenwell, Crystal Lake, both of Ill.

[73] Assignee: Groen Division - Dover Corporation, Elk Grove Village, Ill.

[21] Appl. No.: 488,700

[22] Filed: Apr. 26, 1983

Related U.S. Application Data

[62] Division of Ser. No. 356,958, Mar. 11, 1982.

[51] Int. Cl.$^3$ ............... A23D 3/02; A23D 5/02
[52] U.S. Cl. .................... 99/455; 62/342; 99/517
[58] Field of Search .......... 99/517, 455, 470; 366/336–340; 426/601, 606, 607, 608, 524, 519; 62/343, 342, 68

[56] References Cited

U.S. PATENT DOCUMENTS

| 2,853,390 | 9/1958 | McGowan et al. | 426/601 X |
| 3,568,463 | 3/1971 | McMichael et al. | 62/343 |
| 4,217,372 | 8/1980 | Ebskamp | 426/607 |

Primary Examiner—Timothy F. Simone
Attorney, Agent, or Firm—Robert E. Knechtel

[57] ABSTRACT

An improved process and apparatus for chilling and plasticizing fatty materials, particularly lard, shortening and margarine. The molten fat which generally is at 130°–140° F. is delivered to a feed pump which pumps the molten fat into and through a scraped surface heat exchanger. As normally done, approximately 5–25% by volume of air or inert gas is injected into the molten fat on the suction side of the feed pump, to cause the plasticized fat to be white and opaque, rather than translucent. The molten fat is cooled from 130°–140° F. to approximately 70°–86° F. in the heat exchanger, and is partially crystallized. The cooled, partially crystallized product from the heat exchanger passes directly through a crystallizing element where it is subjected to sufficient shearing forces by the rotational circulation of the product around its own hydraulic center to cause radial mixing of the product to form a fine crystal structure. From the crystallizing element, the cooled, plastic product goes directly to a filler.

3 Claims, 3 Drawing Figures

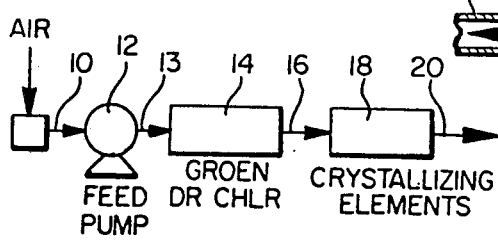
FIG.1
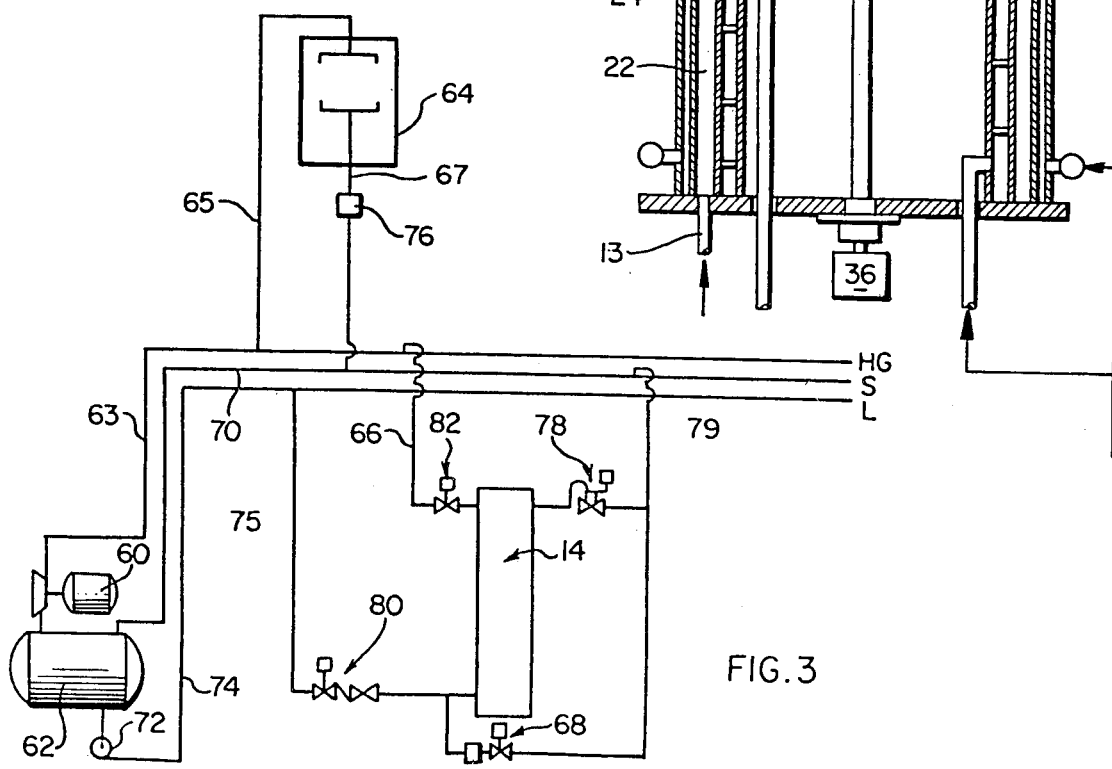

APPARATUS FOR CHILLING AND PLASTICIZING FATTY MATERIALS

This application is a division of application Ser. No. 356,958 filed Mar. 11, 1982.

This invention relates to an improved process and apparatus for the chilling and plasticizing of fatty materials, particularly lard, shortening, and margarine.

Commercially solidified lard, shortening and margarine consists of a mass of small crystals enclosing liquid oil. In the solidification of these fats, fine crystal structure is desired, to render the product smooth in appearance and firm in consistency. The crystals, therefore, are formed by chilling the fat very rapidly. It is also customary to whip into the fat about 5%–25% of its own volume of air or inert gas. These air bubbles are permanently retained by the plastic fat and cause it to be white and opaque, rather than translucent.

The oldest apparatus for the solidification of lard and shortening is the chilling roll. The roll is internally refrigerated by the direct expansion of ammonia or other refrigerants. Turning slowly on its longitudinal and horizontal axis, the roll picks up on its surface, a thin coating of the molten fat from a trough bearing against it and running its full length. The temperature of the fat supplied to the roll varies, but is never very far above the solidification point of the fat. An ejectable blade is used to scrape off the solidified fat in the form of a thin, translucent plastic sheet. The solidified fat then drops into a picker box which consists of a trough bearing a screw conveyor. The flights of the conveyor are interspersed with blades which revolve in the partially filled trough and beat air into the fat. From the picker box, the fat is fed into a high pressure pump which forces it under high pressure through various devices such as orifices, slots, screens, valves and like, which create intense shearing forces, thus breaking up any aggregates of material.

The roll system of solidification described above is generally unsatisfactory and has been replaced by what is commonly referred to as the Votator System which is the subject of U.S. Pat. No. 3,568,463. The process of the Votator System is disclosed and claimed in U.S. Pat. No. 3,455,700. Reference may be made to these patents for a complete description of the system and process. Generally, however, as disclosed, molten fat is introduced under pressure by means of a feed pump and conduit into a standard "A" unit wherein the fat is partially crystallized and passed into a "B" unit by means of another conduit. After working by agitation in the "B" unit, the fat may be conveyed through a conduit through a "C" unit, wherein it is further worked and cooled and subsequently fed through an extrusion valve to a fill line, the necessary pressure or force being provided by a booster pump.

The preferred temperature ranges in the Votator system are 60 degrees F. to 80 degrees F. in the "A" unit; 75 degrees F. to 85 F. in the "B" unit; and 55–75 degrees F. in the "C" unit. Shortening which may be treated includes both blended and all hydrogenated types prepared from animal or vegetable fats, mixtures thereof, as well as emulsified and standard all-purpose household shortening and margarine.

The process and apparatus of the present invention has been found to provide a product equally comparable to the product provided by the Votator system, while at the same time having numerous advantages over it. In addition, the apparatus is greatly simplified, requires far less energy to operate, less floor space and is less costly.

More specifically, in accordance with the present invention, the product, at approximately 130°–140° F. with 5%–25% air (by volume) added, is pumped into and through a DRC scraped surface heat exchanger manufactured by Groen Division, Dover Corporation of Elk Grove Village, Ill., wherein it is cooled to approximately 70°–86° F. From the DRC scraped surface heat exchanger, the product is passed directly through crystallizing elements where it is subject to sufficient shearing forces to form a fine crystal structure. The product from the crystallizing elements goes directly to a filler.

With the above described system of the present invention, product pressures within the range of 40–60 PSI are utilized, whereas with the Votator system high product pressures in excess of 300 PSI are required. In addition, the chilling units of the Votator system have only one heat transfer surface and are usually furnished in multiple tube configurations. The DRC scraped surface heat exchangers are manufactured in a wide variety of sizes, and one unit can have a capacity of 35,000 pounds per hour. A 20,000 pound per hour Votator system requires 100 H.P. to operate, whereas a system having 25,000 pound per hour capacity constructed in accordance with the invention requires only 15½ H.P. Accordingly, the energy required to operate the system of the invention is substantially less than that required by the Votator system.

The Votator System also requires one or more mechanically driven worker units ("B" units) plus two extrusion valves and one extra product pump to produce the product crystal structure required for plasticity. The same results are accomplished with the present invention, with the DRC scraped surface heat exchanger and at least one crystallizing element having no moving parts and no additional pumps. Accordingly, the need for a very complex, high pressure mechanical system is eliminated.

As a result of the above improvements, the system of the invention only requires half the floor space or less, required by the conventional Votator system.

Accordingly, it is an object of the present invention to provide an improved process and apparatus for chilling and plasticizing fatty materials, particularly lard, shortening, and margarine.

A further object is to provide an improved system of the described type which is far less complex than existing systems and which requires far less energy and product pressures to operate it.

These and other objects of the present invention will be apparent from the following detailed description, and the drawings, in which:

FIG. 1 is a flow diagram of the process and apparatus of the present invention;

FIG. 2 is a sectional view illustrating somewhat schematically the construction of the scraped surface heat exchanger; and FIG. 3 is a schematic diagram of a recirculated refrigerant system which preferably is used to cool the heat exchanger.

DESCRIPTION OF THE PREFERRED EMBODIMENT

Referring now to the drawing, in FIG. 1 a molten fat which generally is at 130°–140° F. is delivered through a conduit 10 to a feed pump 12 which pumps the molten fat through a conduit 13 into and through a scraped surface heat exchanger 14. Accordingly, the need for pre-cooling the molten fat, as normally required with the Votator System, is not necessary. As normally done, approximately 5–25% by volume of air or inert gas is injected into the molten fat on the suction side of the feed pump 12, to cause the plasticized fat to be white and opaque, rather than translucent. The molten fat is cooled from 130°–140° F. to approximately 70°–86° F. in the heat exchanger 14, and is partially crystallized. The cooled, partially crystallized product from the heat exchanger 14 passes through a conduit 16 directly through a crystallizing element 18 where it is subjected to sufficient shearing forces to form a fine crystal structure. From the crystallizing element 18, the cooled, plastic product goes directly to a filler 20.

As indicated above, the scraped surface heat exchanger 14 preferably is a DRC scraped surface heat exchanger manufactured by Groen Division, Dover Corporation, such units being commercially available in a variety of sizes or capacities, including a 35,000 pounds per hour capacity. In FIG. 2, one such unit is schematically illustrated, and it can be seen that the fat being cooled flows upwardly through an annular passage 22 which is defined by inner and outer concentric walls 24 and 26. This passage 22 is relatively narrow in the radial direction. The inner wall has a jacket 28 and the outer wall has a jacket 30 which consists of multiple thin film tubes surrounding the annular passage 22 into and through which a coolant is introduced to cool the inner and outer walls 24 and 26, and hence, the product flowing through the annular passage 22 defined by them. The coolant may comprise part of a conventional refrigeration system (not shown), however, preferably and advantageously the coolant is provided by a modern pump recirculated refrigeration system of the type more particularly described below.

A vertical shaft 34 is mounted in suitable bearings and is rotated by a power drive 36 which, as indicated above, can be as small as a 10 H.P. motor, for a 35,000 lb./hr. system referred to above. Rotatably secured to the top of the shaft 34 is a spider 38. A plurality of rods 40 are affixed to this spider 38 and also to a rotor 42 which extends down through the annular passage 22. The rotor 42 therefore is supported and rotated by the shaft 34. A plurality of scraper blades 44, only a portion of which are shown, are secured to the rotor 42 to scrape both the inner and outer walls 24 and 26.

The top of the material passage 22 is enclosed by a housing 46. This housing includes an annular horizontal wall or shelf 48 which terminates in an annular vertical wall 50. The material is discharged from the housing 46 through a discharge opening 52 to the conduit 16. A plurality of wiper blades 54 are affixed to the rods 40 and function to scrape the vertical wall 50 and to move the product from the housing into the discharge opening 52.

The crystallizing element 18, in accordance with the present invention, is a fixed, inline motionless mixer, i.e., a mixer having no moving parts and no external power requirement and which imparts rotational circulation of a processed material about its own hydraulic center in each channel of the mixer to cause radial mixing of the material, which will provide a fine crystal structure which renders the product smooth in appearance and texture. Mixers of the above-described type which have been found to be satisfactory in certain applications, e.g. in plasticizing a frying fat, are conventional, commercially available mixers, such as those manufactured by Komax Systems, Inc. of Long Beach, Calif.; Charles Ross and Sons, Company, Hauppauge, N.Y.; and their equivalents. Depending upon the particular application, the physical design of the motionless mixer may vary to some degree so as to provide the most satisfactory or desired results. The cooled, partially crystallized product from the heat exchanger 14 is subjected to sufficient shearing forces to form a fine crystal structure as it passes through the crystallizing element 18.

METHOD AND OPERATION

The fatty material to be chilled and plasticized has 5–25% air or inert gas (by volume) added to it so that the product is white and opaque, rather than translucent, before it enters the DRC scraped surface heat exchanger 14. The fatty material is pumped into and through the latter by means of the feed pump 12.

The fatty material upon entering the heat exchanger 14 flows upwardly through the annular passage 22 and, in doing so, is cooled from approximately 130°–140° F. to approximately 70°–86° F. and is partially crystallized. The cooled product is scraped from the inner and outer walls 26 and 28 by the scraper blades 44, and enters the housing 46 at the top. The product within the housing 46 is scraped from the wall 50 and is moved from housing 46 into the discharge opening 52. As indicated, the heat exchanger 14 may have a capacity of 35,000 pounds per hour, and only a 10 H.P. motor is required to operate it at this capacity.

From the DRC scraper surface heat exchanger 14, the cooled, partially crystallized product flows from the discharge opening 52 through the conduit 16 into and through the crystallizing elements 18. In the crystallizing elements 18, the product is subjected to sufficient shearing forces to form a fine crystal structure, thus providing a plasticized product which is comparable to the product obtained from the Votator system. This product can be conveyed directly to the filler for filling cartons and the like.

The product pressures required for operation fall within a range of 40–60 PSI, hence, relatively low product pressures are required in comparison to the Votator and other similar types of systems.

As indicated above, the coolant for the heat exchanger 14 may be provided by a conventional refrigeration system such as a flooded refrigeration system, or its equivalent. Preferably and advantageously, however, a recirculated refrigeration system, preferably employing ammonia, as illustrated in FIG. 3, is used since this system allows for either heating or cooling of a product, within the parameters of the temperature of the hot gas, and evaporation temperature. This feature is extremely useful in freeing a stuck rotor, cleaning product from the heat exchanger, and stopping the refrigeration effect instantly, to mention but a few of the advantages provided by it. With a flooded system, for example, it takes considerable periods of time, and labor, to free a stuck rotor, or to warm the heat exchanger to clean the product from it, or to stop the refrigeration effect.

In the recirculated refrigerant system, the compressor 60 is protected by an accumulator 62 rather than a surge drum at each evaporator as is generally the practice in a flooded system. The liquid refrigerant is pumped to the heat exchanger 14 mechanically by means of a refrigerant pump 72 at a temperature approaching its temperature, and in a quantity greater than would be evaporated in the heat exchanger 14 at full load. The liquid refrigerant not boiled off carries any oil along with it back to the accumulator 62 where it is normally removed, recovered and reused automatically. The system does not have to have a high condensing temperature to provide the motive power for the liquid refrigerant. The heat from the compressor 60 can be partially or all recovered for use, within the plant or building as desired, or can be dumped through the condenser 64 to the ambient atmosphere.

More particularly, in the illustrated recirculated refrigerant system, the compressor 60 removes boil-off gas and flash gas from the accumulator 62 to maintain a constant pressure and temperature within the heat exchanger 14 and the low pressure side of the system. The boil-off and flash gas is compressed to a high temperature, high pressure gas and pumped to a condenser 64, via lines 63 and 65. The condenser 64 is controlled to remove all the latent heat or part of it as desired by the need for heat recovery. The liquid condensate from the condenser 64 flows through a line 67 by gravity, as a high temperature, high pressure liquid, to a liquid drain valve 76. The liquid drain valve 76 allows liquid to pass, but closes when exposed to gas. The high temperature, high pressure liquid is changed as it passes through the liquid drain valve 76 to a low pressure flash gas. This liquid-gas mixture flows into a suction line 70 where it returns to the accumulator 62, the cold liquid drops to the bottom of the accumulator, and the flash gas goes back to the compressor 64 and starts the cycle all over.

The cold liquid from the bottom of the accumulator 62 is mechanically pumped by a liquid refrigerant pump 72 to the heat exchanger 14, via the lines 74 and 75. When a product is to be cooled by the heat exchanger 14, the liquid flow regulator valve 80 at the input side of the heat exchanger, and the suction regulator and stop valve 78 at its output side, both are opened to permit the liquid refrigerand to flow through the heat exchanger. As the liquid refrigerant flows through the heat exchanger, the suction regulator and stop valve 78 are modulating to maintain a constant temperature in the heat exchanger 14. The liquid flow regulator valve 80 feeds a constant amount of liquid (normally three times as much as would be boiled off by the heat exchanger 14 at the full load) into the heat exchanger 14. The heat exchanger 14, as indicated above, consists of multiple thin film tubes surrounding the thin film product channel 22 on both sides. The low temperature liquid refrigerant proceeds through the heat exchanger 14, picking up heat, causing the liquid refrigerant to boil. As the refrigerant boils, the volume increases, causing extreme violence at the surface of the thin film tubes, rapidly removing the forming bubbles of gas as they are formed, keeping the heat exchanger surface wetted, thereby greatly enhancing the heat transfer coefficients of the surface, and nearly totally wiping away the film resistance to heat transfer at the surface.

The boiled-off gas, along with the unevaporated liquid refrigerant, and any entrained oil, then passes through the suction regulator and stop valve 78 and line 79 into the suction line 70 and then back to the accumulator 62. In the accumulator 62, the gas and liquid are again separated, and the oil is recovered and reused. The liquid is recirculated by the refrigerant pump 72, and the gas returns to the compressor 60.

The thin film enhanced heat transfer surface is unique, in that little liquid refrigerant is required per unit of cooling. The heat transfer rate is greatly increased per unit of surface.

To switch from cooling to heating, it is only necessary to operate a switch to close the liquid flow regulator valve 80 and to open the hot gas valve 82. The high temperature, high pressure gas which normally is delivered to the condenser 64 then is partially diverted through line 66 and the hot gas valve 82 to the heat exchanger 14. The hot gas heats the heat exchanger 14, thus freeing a rotor which is stuck as a result of overcooled product is easily and quickly accomplished. This same feature permits the heat exchanger 14 to be more easily cleaned, or to stop immediately the refrigeration effect.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. Apparatus for chilling and plasticizing fatty materials which have 5-25% air or inert gas by volume added thereto so as to be white and opaque rather than translucent comprising a means for cooling and partially crystallizing said fatty material from approximately 130°-140° F. to within a range of 70°-86° F.; at least one crystallizing element which comprises a motionless mixer for applying a shearing action to said cooled and partially crystallized material to provide a material having a fine crystal structure by the rotational circulation of said material around its own hydraulic center to cause radial mixing of said material; means for conveying said cooled and partially crystallized material to said crystallizing element and means for conveying the output of said crystallizing element to a filler.

2. The apparatus of claim 1, wherein said means for chilling and partially crystallizing said fatty material comprises a scraped surface heat exchanger having an inner wall and an outer wall defining a vertical annular passage through which said fatty material is passed, means for cooling the said inner and outer walls defining said annular passage and the fatty material flowing therein, means for scraping the cooled fatty material from said inner and outer walls defining said annular passage, a housing at the top of said annular passage having a discharge opening therein, said fatty material flowing upwardly through said annular passage into said housing, and means for moving said fatty material in said housing into said discharge opening.

3. The apparatus of claim 1; wherein said crystallizing element is a fixed, inline motionless mixer.

* * * * *